No. 682,942. Patented Sept. 17, 1901.
B. G. LAMME.
ROTARY TRANSFORMER.
(Application filed Jan. 28, 1897.)

(No Model.) 2 Sheets—Sheet 1.

WITNESSES
Ethan D. Dodds
Hubert C. Tener

INVENTOR
Benjamin G. Lamme
BY
Wesley G. Carr
ATTORNEY.

No. 682,942. Patented Sept. 17, 1901.
B. G. LAMME.
ROTARY TRANSFORMER.
(Application filed Jan. 28, 1897.)
(No Model.) 2 Sheets—Sheet 2.
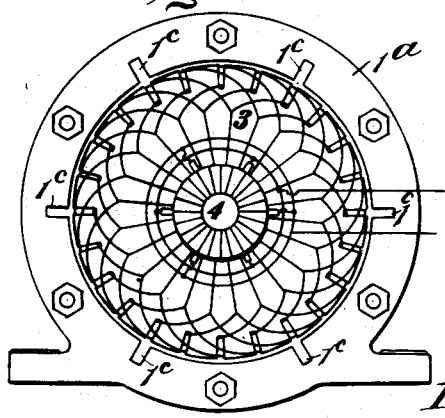
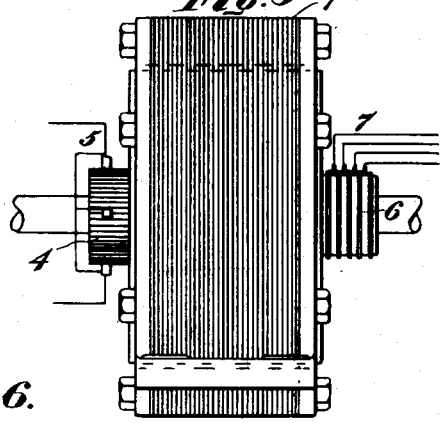
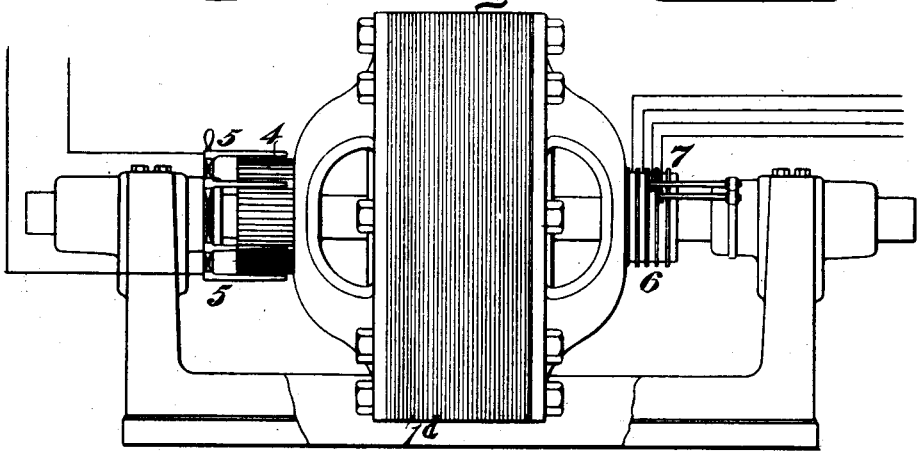
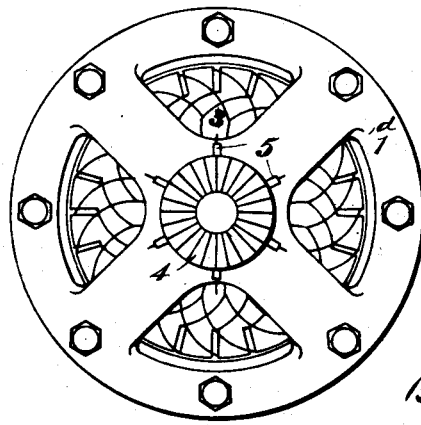
WITNESSES:
Ethan P. Dodds
H. C. Tener
INVENTOR
Benjamin G. Lamme
BY
Wesley G. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF SAME PLACE.

ROTARY TRANSFORMER.

SPECIFICATION forming part of Letters Patent No. 682,942, dated September 17, 1901.

Application filed January 28, 1897. Serial No. 621,117. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Rotary Transformers, (Case No. 726,) of which the following is a specification.

My invention relates to systems of electric distribution involving means for converting alternating into direct currents; and it has for one of its objects to provide a rotary transformer for converting multiphase alternating currents into direct currents which shall operate efficiently and satisfactorily irrespective of the wave form of the currents supplied to it and the number and character of the machines which may be coupled in parallel with it.

Figure 1:
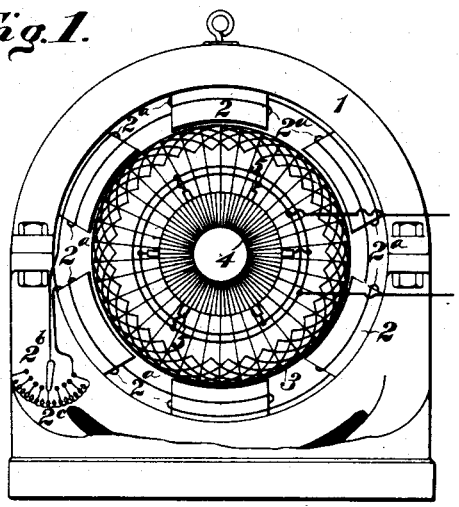
Figure 2:
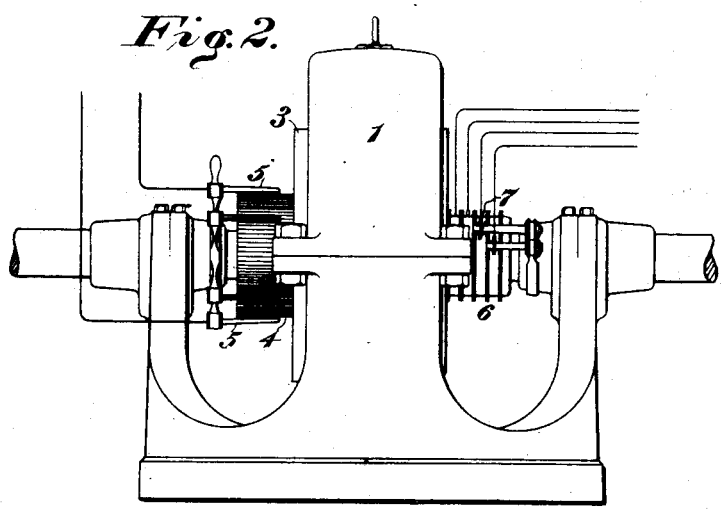
Figure 3:
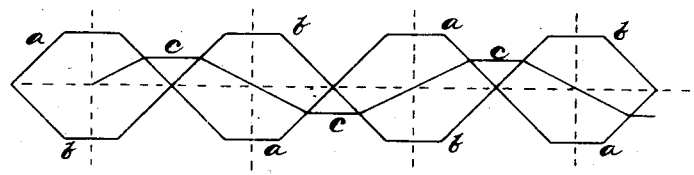

Reference being had to the accompanying drawings, Figure 1 is an end elevation of a rotary transformer constructed in accordance with one feature of my invention, the end bearing being broken away and the armature conductors and commutator being shown diagrammatically. Fig. 2 is a side elevation of the rotary transformer shown in Fig. 1. Fig. 3 is a diagram illustrating the phase relation and amplitude of the magnetic fields produced by the armature-currents of the transformer shown in Figs. 1 and 2. Figs. 4 and 5 are respectively an end and a side elevation of a modified form of machine embodying my invention, the shaft-bearings being omitted. Fig. 6 is a side elevation of another modification of my invention, and Fig. 7 is an end elevation of the rotatable parts of the machine shown in Fig. 6.

Reference being now had to Figs. 1 to 3 of the drawings, 1 is a multipolar field-magnet of ordinary construction, except that the pole-pieces 2 are preferably shorter and wider than those usually employed and are not provided with magnetizing-coils. In some cases coils may be altogether omitted from the field-magnet pole-pieces, but for machines the size and construction of which are not such as to afford the necessary circuits for induced secondary currents in the frame itself coils $2^a$ are provided. These coils may be joined together in series, as shown, or in some cases each coil may be closed upon itself. Where the coils $2^a$ are joined together in series, as indicated in Fig. 1, it will usually be advisable to provide a switch $2^b$ for opening and closing the circuit. This switch may also embody a variable resistance $2^c$. The pole-pieces 2 are preferably laminated, as is usual, and cast into the body or frame of the field-magnet. The armature 3, which is shown diagrammatically, is preferably of the usual iron-clad type—that is, provided with deep slots or grooves in which the coils are located—the winding being of the usual direct-current-generator closed-coil type, and connected at one end to the segments of commutator-cylinder 4, on which bear brushes 5, and at the other end to collecting-rings 6, on which bear brushes 7. In the construction shown four rings and four brushes are employed, which indicates that the machine is constructed for the transformation of two-phase alternating currents, although it is to be understood that the machine may be constructed for the transformation of currents of a different number of phases, if desired.

If multiphase currents are applied to the armature-winding of the machine above described at the proper points, magnetic fields or poles shifting or rotating about the axis are produced, the armature-winding forming the magnetizing-coils. If the armature be rotated in a direction opposite to that of the shifting magnetic field and at an equal rate of speed, the poles or fields will remain fixed in space, as in an ordinary machine with field-magnets carrying magnetizing-coils. If the brushes be located on the commutator-cylinder in positions midway between the poles, they will deliver direct current. In order to keep the magnetizing-current small, there must be a good magnetic path outside of the armature-body. This is provided in the form illustrated by the cast-iron frame having the laminated pole-pieces. The spaces $1^c$ between adjacent pole-pieces obviously constitute slots or grooves in the field-magnet frame taken as a whole, this construction being employed in order to provide or insure neutral points to facilitate commutation of the currents generated or transformed in the armature of the machine. If the armature-coils are of the same width as the pitch, the magnetic field due to one phase is pointed, while the resultant of the two phases is flat-topped, the areas of the two being equal, but the heights being different. Consequently the total induction per pole is constant, but the maximum resultant induction is materially different from the maximum induction due to each phase. By making the coils somewhat narrower than the pitch the shape of the field due to one phase is made flat on top and the resultant of the two is also flat. By this means the shape of the magnetic field may be made almost constant at all times and the maximum induction will also be substantially constant, as will be clearly understood by reference to my Patent No. 599,940, granted March 1, 1898. The maximum value of the magnetic field corresponds to the point where the alternating current is supplied to the winding. The direct current will also set up a magnetic field which is a maximum at the point where the direct-current brushes are in contact. The direct-current brushes should commutate the coils at the edge of the field which generates the direct-current electromotive force, and consequently the field due to the magnetizing alternating current should be shifted to a ninety-degree position with respect to the field due to the direct current in order to give proper commutation. This is actually the condition in the machine, for the magnetizing alternating current lags about ninety degrees behind the alternating-current electromotive force, as is evidenced by the fact that the apparent magnetizing energy is much greater than the true watts when the machine is running without load. As the load comes on, the alternating current, which is represented by an equivalent direct current, is in phase with the electromotive force applied, and therefore at ninety degrees to the magnetizing-current. This useful alternating current will also set up a field. We have then three magnetic fields set up, two of which are one hundred and eighty degrees from each other and the third at ninety degrees from each of the others. The two at one hundred and eighty degrees are those due, respectively, to the useful alternating current and the direct current. These are opposite and approximately equal in value, and they therefore neutralize each other. The field set up by the useful alternating current is represented in Fig. 3 by the line $a$, that by the direct current by the line $b$, and that by the magnetizing alternating current by the line $c$. As the direct current and the useful alternating currents are very nearly equal in magnetizing power and oppose each other, the only field in the machine is that due to the magnetizing-current. This may be much less than would be given by either of the other two fields, or, in other words, the magnetizing-current in a properly-designed machine of this type may be made much smaller than the useful current and the resultant current may be very little greater than the useful current. The losses due to the resistance of the windings are much less than in a direct-current generator delivering the same current. The useful alternating current at times feeds directly into the direct-current brushes, and at the worst condition the winding is utilized advantageously. The resultant copper loss due to the useful alternating current is about thirty-eight per cent. for two phases and about sixty per cent. for three phases of the loss in a direct-current machine. To this must be added the loss due to the magnetizing-current, which is usually small.

It has been found that if the keeper or outer ring is in the form of a cast yoke provided with either cast or laminated poles or projections, as indicated in the drawings, the armature will run at the proper speed without any other devices for driving. This is similar to making the external ring with notches to reduce the local field around the commutated coils, as shown in Fig. 4 and hereinafter described. As has already been stated in substance, coils located on the pole-pieces and short-circuited on themselves are useful and desirable in machines the yokes or frames of which are laminated or are so small in cross-section that they do not afford proper circuits for induced secondary currents.

A machine like that described is independent of wave form and may therefore be run in connection with any type of alternating-current generator. Such a machine will run steadily under any condition, whereas a rotary transformer of the ordinary form is sensitive to line drop, adjustment of field strength, &c. Several machines of the type described may be run from a common set of bus-bars without interfering with the operation of each other in any way. The efficiency of such machines is high on account of there being no field losses, and the amount of copper employed is only about one-fourth of that necessary in the ordinary form of rotary transformer.

In Figs. 4 and 5 I have shown a machine having an armature, commutator, collecting-rings, and brushes like the corresponding parts shown in Figs. 1 and 2. In this form of machine, however, I employ a ring or keeper $1^a$, built up of laminæ, provided with slots or grooves $1^c$ corresponding in number and position to the spaces or slots between the pole-pieces 2 of the machine. (Shown in Figs. 1 and 2.) Since these slots or spaces are intended to provide neutral points for commutating purposes, it will be understood that they will correspond to the commutator-brushes in number and position.

In the machine shown in Figs. 6 and 7 I employ a laminated ring or keeper $1^d$, so mounted as to rotate with the armature, an air-gap being provided between these parts, as in the forms already described. Inasmuch as the keeper rotates with the armature, grooves or slots will serve no useful purpose and need not therefore be provided. The operation of this modification also differs from that of each of the other forms shown and described in that the machine is not self-propelling.

I desire it to be understood that the details of my invention may be varied from what is shown and described without departing from its spirit and scope.

I claim as my invention—

1. In a rotary transformer for converting multiphase alternating currents into direct currents, the combination with a member having magnetizing-coils, of means for supplying multiphase currents to said coils and means for taking direct currents therefrom, and a magnetizable member having laminated projections separated by air-spaces and located adjacent to said coil-wound member but having no magnetizing-coils, whereby the machine runs as a motor and delivers a smooth, direct current.

2. In a rotary transformer, the combination with two concentrically-arranged and relatively rotatable magnetizable members only one of which is provided with a magnetizing-winding, of means for supplying multiphase alternating currents to said winding and a commutator for taking direct currents therefrom, the other member being provided with grooves or slots corresponding in number and position to the commutator-brushes.

3. Means for transforming alternating into continuous currents, comprising a slotted cylindrical core, a commutator, collecting-rings and brushes, a closed-coil winding located in the slots of said core and connected to the commutator-segments and collecting-rings, and a slotted magnetizable member without magnetizing-coils surrounding said cylindrical core and in close proximity thereto.

4. Means for transforming multiphase alternating currents into continuous currents, comprising a rotatable core provided with a single winding connected to both the alternating and the continuous current circuits and a magnetizable member without magnetizing-coils in close proximity to said core and its winding.

5. In a rotary transformer for converting multiphase alternating currents into continuous currents, an armature having a magnetizing-winding, means for supplying multiphase currents to said winding and means for taking direct current therefrom, in combination with a field-magnet having inwardly-projecting laminated pole-pieces without magnetizing-coils, whereby the counter electromotive force of the machine is dependent entirely upon the magnetic field set up by said armature, and runs as a motor.

6. A rectifier for phase-differing alternate currents consisting of a cylindrical core having a continuous winding, said winding being connected to the source of phase-differing alternate currents at angular intervals corresponding to the phase differences of said currents, and further connected at regular intervals to segments of a commutator, a keeper traversed solely by the flux due to said phase-differing currents and brushes connected with the work-circuit and bearing upon said commutator and means for maintaining said brushes continuously in contact with the points of maximum potential in said winding, substantially as described.

7. In a rectifier for alternating currents of different phase, a cylindrical core having continuous winding, said winding being connected to a source of phase-differing alternating currents at regular intervals corresponding to the phase difference of said currents, and further connected at regular intervals to segments of a commutator and brushes connected with the work-circuit bearing upon said commutator in combination with a keeper having polar projections as to which said cylindrical core is relatively revoluble, said keeper being energized only from the flux of the currents passing through the winding on said cylindrical core, substantially as described.

In testimony whereof I have hereunto subscribed my name this 26th day of January, A. D. 1897.

BENJ. G. LAMME.

Witnesses:
WESLEY G. CARR,
HUBERT C. TENER.